(12) United States Patent
Zhao et al.

(10) Patent No.: US 10,592,036 B2
(45) Date of Patent: Mar. 17, 2020

(54) TOUCH DISPLAY PANEL AND METHOD FOR DRIVING THE SAME, AND DISPLAY DEVICE

(71) Applicants: BOE TECHNOLOGY GROUP CO., LTD., Beijing (CN); Hefei BOE Optoelectronics Technology Co., Ltd., Hefei, Anhui (CN)

(72) Inventors: Yuanyang Zhao, Beijing (CN); Xianjie Shao, Beijing (CN); Honggang Gu, Beijing (CN); Haosen Ge, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/938,405

(22) Filed: Mar. 28, 2018

(65) Prior Publication Data

US 2019/0129519 A1 May 2, 2019

(30) Foreign Application Priority Data

Oct. 27, 2017 (CN) .......................... 2017 1 1020957

(51) Int. Cl.
*G06F 3/041* (2006.01)
*G06F 3/03* (2006.01)
*G06F 3/042* (2006.01)

(52) U.S. Cl.
CPC .......... *G06F 3/0414* (2013.01); *G06F 3/0304* (2013.01); *G06F 3/042* (2013.01); *G06F 3/0412* (2013.01)

(58) Field of Classification Search
CPC ..... G06F 3/0414; G06F 3/0412; G06F 3/0304
See application file for complete search history.

(56) References Cited

U.S. PATENT DOCUMENTS 8,049,739 B2 11/2011 Wu et al.
9,547,384 B2 1/2017 Zhang
(Continued)

FOREIGN PATENT DOCUMENTS

CN 102341776 A 2/2012
CN 103336635 A 10/2013
(Continued)

OTHER PUBLICATIONS

First Chinese Office Action dated Dec. 18, 2019, received for corresponding Chinese Application No. 201711020957.2, 25 pages.

*Primary Examiner* — Premal R Patel
(74) *Attorney, Agent, or Firm* — Kinney & Lange, P.A.

(57) ABSTRACT

A touch display panel is provided in the embodiments of the disclosure, including: a liquid crystal layer; and a detection layer for light-intensity, which is located at a light exiting side of the liquid crystal layer and is configured to detect an intensity of light passing through the liquid crystal layer at a region thereof corresponding to a touch position on the touch display panel, at which the touch position on the touch display panel is set to be touched, in both conditions that the touch position on the touch display panel is touched and not touched by a touch action. In addition, a display device and a method for driving the touch display panel are also provided in embodiments of the disclosure.

14 Claims, 3 Drawing Sheets

(56) References Cited

U.S. PATENT DOCUMENTS

| | | | |
|---|---|---|---|
| 10,379,676 B2 | 8/2019 | Lee et al. | |
| 2011/0310049 A1* | 12/2011 | Homma | G06F 3/04883 |
| | | | 345/173 |
| 2012/0062817 A1* | 3/2012 | Kanbayashi | G02F 1/13338 |
| | | | 349/61 |
| 2015/0185933 A1* | 7/2015 | Zhang | G06F 3/044 |
| | | | 345/174 |
| 2016/0065838 A1* | 3/2016 | Chen | H04N 5/23216 |
| | | | 348/333.02 |
| 2016/0299598 A1* | 10/2016 | Yoon | G06F 3/044 |
| 2016/0334898 A1* | 11/2016 | Kwak | G06F 3/0412 |

FOREIGN PATENT DOCUMENTS

| | | |
|---|---|---|
| CN | 104880842 A | 9/2015 |
| CN | 205139869 U | 4/2016 |
| CN | 106406617 A | 2/2017 |
| CN | 106502455 A | 3/2017 |
| TW | 200811803 A | 3/2008 |

\* cited by examiner

TOUCH DISPLAY PANEL AND METHOD FOR DRIVING THE SAME, AND DISPLAY DEVICE

CROSS-REFERENCE TO RELATED INVENTION

The present disclosure claims the benefit of Chinese Patent Application Invention No. 201711020957.2 filed on Oct. 27, 2017 in the State Intellectual Property Office of China, the whole disclosure of which is incorporated herein by reference.

FIELD OF THE INVENTION

Embodiments of the present disclosure pertain to the technical field of touch control, and especially to a touch display panel and relevant display device, as well as corresponding method for driving the relevant display device.

BACKGROUND OF THE INVENTION

With rapid development of touch-on-display technology, electronic devices provided with touch screens are widely used. Touch screens may be divided into several categories, such as pressure sensing touch screen, resistive touch screen, capacitive touch screen, infrared touch screen and surface acoustic touch screen, and the like. The capacitive touch screen is undoubtedly the most widely used touch screen, comprising transverse and longitudinal electrode arrays which are formed by ITO (indium tin oxide) material and cooperate with each other to form collectively a plurality of test points which are distributed uniformly on a surface of the screen, at intersection points where they intersect with each other. Since self-capacitance may be created among adjacent electrodes, then, variation of the self-capacitance at various test points may be acquired by a self-capacitance scanning, so as to implement a detection of a single touch. In addition, since mutual-capacitance may also be created among adjacent electrodes, then, variation of the mutual-capacitance at various test points may also be acquired by mutual-capacitance scanning, so as to implement a detection of a multi-touch.

A so-called "3D touch" is a stereoscopic touch technology which may enhance perception of both touch strength and touch area as compared with a multi-touch operation in a planar two-dimensional space. Nowadays, the 3D touch technology may only distinguish between two touch forms of "gentle/soft pressing" and "hard pressing" which differ from each other in degrees of strength of the applied pressure by touch operations, and thus has some difficulty in application thereof for detection of values of the pressure applied by touch operations and determination of touch position at which the touch operation is implemented, resulting in a difficulty in fine rating of the pressure applied by touch operations.

SUMMARY OF THE INVENTION

According to an aspect of the exemplary embodiment of the present disclosure, there is provided a touch display panel, including: a liquid crystal layer; and a detection layer for light-intensity, which is located at a light exiting side of the liquid crystal layer and is configured to detect an intensity of light passing through the liquid crystal layer at a region thereof corresponding to a touch position on the touch display panel, in both conditions that the touch position on the touch display panel is touched and not touched by a touch action.

In an embodiment of the disclosure, the touch display panel further includes an analytical unit which is arranged to be connected electrically with the detection layer for light-intensity through an electrical connector, and is configured to receive an electrical signal which is generated from the detection layer for light-intensity through the electrical connector so as to determine a magnitude of a pressure applied by the touch action and in turn to rate a level of the pressure depending on the magnitude thereof as determined.

In an embodiment of the disclosure, the touch display panel further includes sealant which functions as the electrical connector and is doped with metallic material, the analytical unit being connected electrically with the detection layer for light-intensity via the metallic material inside the sealant.

In an embodiment of the disclosure, the detection layer for light-intensity includes a plurality of detectors which are arranged in an array.

In an embodiment of the disclosure, each of the plurality of detectors is one of a photoelectric detector and a thermal detector.

In an embodiment of the disclosure, the touch display panel further includes a black matrix and a signal wiring which is arranged to be connected with the plurality of detectors, orthographic projections of the plurality of detectors and the signal wiring on the liquid crystal layer being located within a orthographic projection of the black matrix on the liquid crystal layer.

In an embodiment of the disclosure, the touch display panel further includes a color filter layer which is located at a side of the detection layer for light-intensity facing away from the liquid crystal layer.

In an embodiment of the disclosure, the touch display panel further includes an array layer provided at a side of the liquid crystal layer facing away from the detection layer for light-intensity and a touch-sensing signal transmission layer provided between the liquid crystal layer and the array layer.

According to another aspect of the exemplary embodiment of the present disclosure, there is also provided a display device, including: a housing; the touch display panel as above; and a drive circuit for the touch display panel.

According to yet another aspect of the exemplary embodiment of the present disclosure, there is further provided a method for driving the touch display panel according to claim 1, including: detecting the intensity of light passing through the liquid crystal layer at the region thereof corresponding to the touch position on the touch display panel in a condition that the touch position on the touch display panel is touched by the touch action, by the detection layer for light-intensity; and determining touch information by comparing the intensity of light passing through the liquid crystal layer in the condition that the touch position on the touch display panel is touched, with an intensity of light passing through the liquid crystal layer in a condition that the touch position on the touch display panel is not touched.

In an embodiment of the disclosure, the touch information includes a magnitude of a pressure applied by the touch action and the touch position, and determining touch information including determining the magnitude of the pressure applied by the touch action at the touch position.

In an embodiment of the disclosure, the touch display panel further includes an analytical unit, which is arranged to be connected electrically with the detection layer for light-intensity through an electrical connector, and configured to receive an electrical signal which is generated from the detection layer for light-intensity through the electrical connector so as to determine magnitude of the pressure applied by the touch action and in turn to rate a level of the pressure depending on the magnitude thereof as determined; and determining the magnitude of the pressure applied by the touch action at the touch position includes:

converting the intensity of light passing through the liquid crystal layer in the condition that the touch position on the touch display panel is not touched into a corresponding first electrical signal and transferring the first electrical signal to the analytical unit;

converting the intensity of light passing through the liquid crystal layer in the condition that the touch position on the touch display panel is touched into a corresponding second electrical signal and transferring the second electrical signal to the analytical unit; and determining the magnitude of the pressure applied by the touch action, by comparing the first electrical signal in the condition that the touch position on the touch display panel is not touched and the second electrical signal in the condition that the touch position on the touch display panel is touched.

In an embodiment of the disclosure, the analytical unit stores therein a data table which contains ratings of the pressure applied by the touch action corresponding to different magnitudes of the pressure, and the analytical unit rates the level of the pressure depending on the magnitude thereof.

In an embodiment of the disclosure, the detection layer for light-intensity includes a plurality of detectors which are arranged in an array, and each of the plurality of detectors is marked with values of coordinates thereof, respectively.

In an embodiment of the disclosure, the intensity of light passing through the liquid crystal layer in the condition that the touch position on the touch display panel is not touched is determined by one of:

detecting the intensity of light passing through the liquid crystal layer in the condition that the touch position on the touch display panel is not touched, by the detection layer for light-intensity; and detecting brightness of the touch display panel in the condition that the touch position on the touch display panel is not touched.

In an embodiment of the disclosure, a storage device which is located outside the analytical unit stores therein a data table which contains ratings of the pressure applied by the touch action corresponding to different magnitudes of the pressure, and the analytical unit invokes the data table from the storage device and rates the level of the pressure depending on the magnitude thereof.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF EMBODIMENTS OF THE INVENTION

Figure 1:
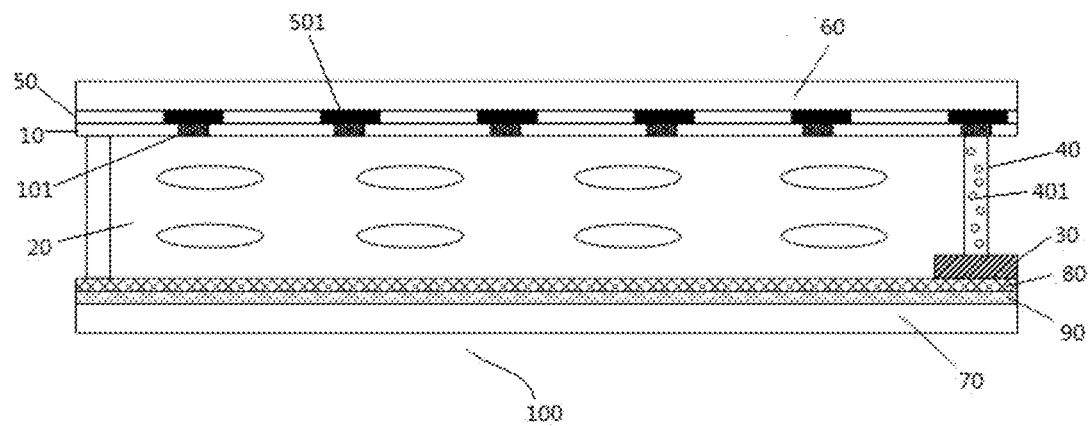
FIG. 1 illustrates a structural schematic view of a typical exemplary embodiment of a touch display panel according to embodiments of the disclosure.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiments set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to illustrate the contents of the disclosure, rather than to demonstrate the practical dimension or proportion of components of the touch display panel and the display device.

Additional aspects and advantages of embodiments of the disclosure may be provided in following depictions, and may become more apparent therefrom, or get to be known based on practice of embodiments of the disclosure.

Figure 2:
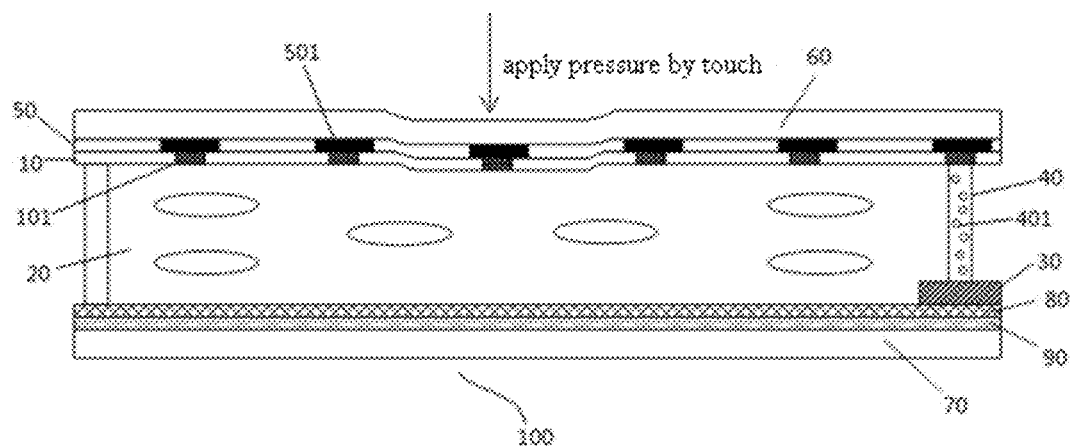
FIG. 2 illustrates a schematic view of deformation of the touch display panel as illustrated in FIG. 1, once it is subject to a pressure applied by a touch action.

Referring to FIGS. 1 and 2, according to a general technical concept of embodiments of the present disclosure, there is provided a touch display panel, and in a typical exemplary embodiment thereof the touch display panel 100 includes: a liquid crystal layer 20; and a detection layer 10 for light-intensity, which is located at a light emergent side of the liquid crystal layer 20 at which side light exits the liquid crystal layer and is configured to detect an intensity of light passing through the liquid crystal layer 20 at a region thereof corresponding to a touch position on the touch display panel, at which position the touch display panel is set to be touched.

Specifically, taking an ADS (advanced super dimension switch) product as an example, a light transmittance T of the touch display panel 100 may be represented as below:

$$T = \frac{1}{2}\sin^2 2\varphi \, \sin^2 \frac{\pi \Delta n d}{\lambda} \qquad [1]$$

wherein φ is an azimuth angle at which the liquid crystal molecules deflect,

Δn is a birefringence of the liquid crystal layer 20, d is a thickness of the liquid crystal layer 20, and λ is a wavelength of incident light.

The touch display panel 100 may deform slightly when it is squeezed/pressed by an external acting force; in other words, the touch display panel 100 may deform slightly at a touch position thereon at which a pressure is applied by a touch action. Correspondingly, with the increase in degree of compression on the liquid crystal layer 20 at a location thereof corresponding to the touch position, a reduced thickness, and in turn a decreased amount of liquid crystal, may thus be incurred there; i.e., the amount of liquid crystal molecules which may emit light there is decreased, resulting in a reduced display brightness/luminance there. The greater the pressure, the more the brightness decreases, and accordingly, the more the intensity of light passing through the liquid crystal layer decreases; i.e., a decrement of the intensity of light passing through the liquid crystal layer may be even larger. On the contrary, with the decrease in degree of compression on the liquid crystal layer 20 at a location thereof corresponding to the touch position, a gradual restoration of thickness implemented by a steady increase thereof and in turn an increased amount of liquid crystal may thus be incurred there, i.e., amount of liquid crystal molecules which may emit light there is increased, resulting in an increased display brightness/luminance there. Accordingly, an increment of the intensity of light passing through the liquid crystal layer may be even larger. The detection layer 10 for light-intensity may detect the intensity of light passing through the liquid crystal layer 20 at the region thereof corresponding to the touch position on the touch display panel, at which the touch display panel is set to be touched, in both conditions that the touch position on the touch display panel is touched and not touched by the touch action, and then convert two resulting optical signals into two electrical signals, respectively, each of which may for example be voltage or current. It is obvious that, the intensity of light passing through the liquid crystal layer 20 in the condition that the touch position on the touch display panel is touched, may differ from intensity of light passing through the liquid crystal layer 20 in a condition that the touch display panel is not touched, at the touch position, in turn bringing about a difference between magnitudes of the two resulting electrical signals. The detection layer 10 for light-intensity may then determine a variation of the intensity of light passing through the liquid crystal layer 20 at the region thereof corresponding to the touch position on the touch display panel, depending on the two intensities of light as detected above, facilitating determination of a magnitude of a pressure applied on the touch display panel by the touch action by an external detection device or an internal detection device provided within the touch display panel 100. Once the magnitude of the pressure applied by the touch action is determined, for example, different pressures applied during touch with different magnitudes may be preset to correspond to different display contents and display effects, then corresponding display contents and display effects may be presented on the touch display panel 100, e.g., depending on specific magnitudes of the pressure applied by the touch action as determined above, such that display functions of the touch display panel 100 may be enriched hereby.

In the conventional "3D touch" technology, since it takes advantage of perception of both touch pressure and touch area, then, by way of example, by long press on the touch display panel 100, a quick browse on pictures, a hyperlink, and so on may be implemented; however, since the conventional 3D touch technology may for example only distinguish between a "micro vibration" which lasts about 10 milliseconds and a "full-scale vibration" or "absolute vibration" which lasts at least 15 milliseconds, then both display contents and display effects which may be presented in these conditions are extremely limited. In contrast, the touch display panel 100 in embodiments of the disclosure may determine the magnitude of the pressure applied by the touch action by detecting the intensity of light passing through the liquid crystal layer 20, and in turn rate the pressure applied by the touch action based on the magnitude thereof as determined, and then specify different display contents and display effects corresponding to different rating of the pressure applied by the touch action, resulting in enriched display functions.

In further embodiments of the disclosure, as illustrated in FIG. 1, the touch display panel 100 further includes an analytical unit 30, which is configured to analyze the magnitude of the pressure applied by the touch action, with a function of Force Touch or Press Touch which is implemented by rating specific level of the pressure as sensed, so as to function as the aforementioned detection device for determination of the magnitude of the pressure applied on the touch display panel, and is arranged to be connected electrically with the detection layer 10 for light-intensity through an electrical connector provided therebetween. The analytical unit 30 is specifically configured to receive an electrical signal which is generated from the detection layer 10 for light-intensity through the electrical connector so as to determine the magnitude of the pressure applied by the touch action. The analytical unit 30 is for example integrated within a touch chip, or is for example provided individually. By way of example, FIG. 1 illustrates schematically that the analytical unit 30 is located on a first base substrate 70. It may be well known to those skilled in the art that, the analytical unit 30 is also for example chosen to be located on the second base substrate 60. For example, the analytical unit may be one selected from a group of: MCU, CPU, DSP (i.e., Digital Signal Processor), and PLC (i.e., Programmable Logic Controller) and the like, which may contain a lookup table embedded therein, or connected with a memory or storage device containing a lookup table therein, in which lookup table preset detailed ratings of various values of different magnitudes are stored and accessible by the analytical unit.

Specifically, the detection layer 10 for light-intensity transfers the electrical signals created at the touch position in both conditions that the touch display panel is touched and not touched by the touch action, to the analytical unit 30, respectively, and the analytical unit 30 processes both electrical signals by implementing a comparison therebetween, e.g., by calculating a difference value therebetween, such as an absolute difference, or a relative difference. And the relative difference may for example be a percentage of the magnitude of the electrical signal in the condition that the touch position on the touch display panel is touched by the touch action versus the magnitude of the electrical signal in the condition that the touch position on the touch display panel is not touched by the touch action, or alternatively be a percentage of the absolute difference between the two electrical signals as above versus the magnitude of the electrical signal in the condition that the touch position on the touch display panel is not touched by the touch action. As a result, the magnitude of the pressure applied by the touch action is then determined, and then is rated depending on the magnitude. Similarly, by rating the pressure applied by the touch action, and setting pressures of different ratings to be corresponding to different display contents and display effects, corresponding display contents and display effects may be presented on the touch display panel 100, e.g., based on the specific pressure of a determined rating as applied by the touch action, resulting in enriched display functions.

As illustrated in FIG. 1, the touch display panel 100 for example further includes sealant 40 which is doped with metallic material 401, such that the sealant 40 possesses relative superior electrical conductivity. The sealant 40 functions as aforementioned electrical connector provided between the detection layer 10 for light-intensity and the analytical unit 30, facilitating delivery/transferring of the electrical signal to the analytical unit 30 by the detection layer 10 for light-intensity.

Figure 3:
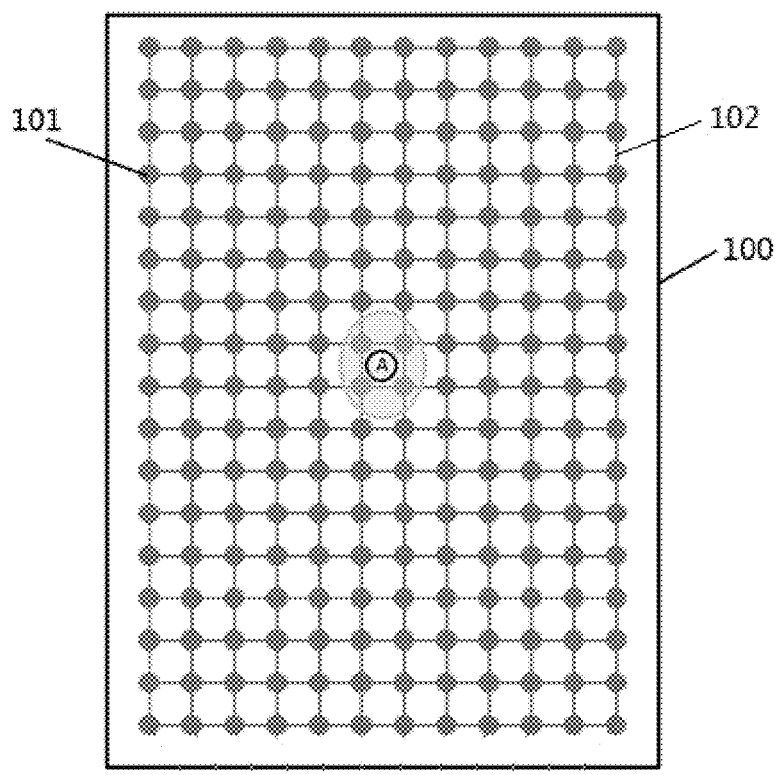
FIG. 3 illustrates a schematic view of arrangement of a plurality of detectors within the touch display panel according to embodiments of the disclosure.

In an embodiment of the disclosure, in view of FIG. 3, by way of example, the detection layer 10 for light-intensity is provided with a plurality of detectors 101 arranged in an array, each of which is configured to detect the intensity of light passing through the liquid crystal layer at a location where it is located; for example, any two adjacent detectors 101 in a same row or a same column are arranged equidistantly. By such a design, on one hand, it is ensured that light intensities at various points on the display panel 100 may be acquired so as to obtain an overall distribution of intensity of light across the whole display panel; on the other hand, it may facilitate a definite determination of a specific touch position, which is acted on by the pressure applied by the touch action, on the display panel.

Continuing to refer to FIG. 3, in a condition that a portion 'A' as illustrated is not touched, the plurality of detectors 101 located around the portion 'A' (e.g., four detectors located within a shaded round area which contains the portion 'A', as illustrated in FIG. 3) may detect an intensity of light passing therethrough and convert an optical signal corresponding thereto into an electrical signal and in turn transfer such electrical signal to the analytical unit 30; and in another condition that the portion 'A' is touched, the plurality of detectors 101 may also detect an intensity of light passing therethrough and convert another optical signal corresponding thereto into another electrical signal and in turn transfer such another electrical signal to the analytical unit 30. The analytical unit 30 receives both above electrical signal generated in the condition that the portion 'A' is not touched and above electrical signal generated in the condition that the portion 'A' is touched, and then determines the magnitude of the pressure applied by the touch action which acts on the portion 'A' by analyzing a variation between the detected intensity of light passing therethrough in the condition that the portion 'A' is touched and the detected intensity of light passing therethrough in the condition that the portion 'A' is not touched, so as to facilitate rating of the pressure applied by the touch action.

By way of example, each of the plurality of detectors 101 is one of a photoelectric detector and a thermal detector.

Figure 4:
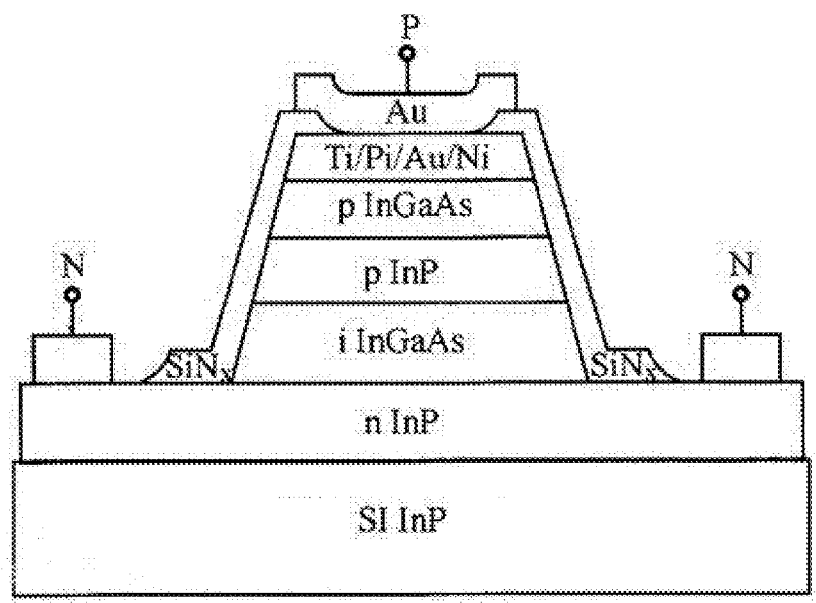
FIG. 4 illustrates a structural schematic view of a typical exemplary embodiment of a photoelectric detector within the touch display panel according to embodiments of the disclosure.

FIG. 4 illustrates a structure of a relatively typical photoelectric detector, whose working principle is based on photoelectric effect. To be specific, typically, all semiconductive material having appropriate energy gap or impurity ionization energy may result in the photoelectric effect; however, in order to manufacture a practical device, several factors should be taken into consideration such as performance/properties, processes, price/cost, and the like. For example, as to a backlight source of TFT-LCD, a material which is available for photoelectrical detector and is useful in bands of radiation ray and visible light may be CdS, CdSe, CdTe, Si, Ge, and the like. Therefore, by way of example, each of the detectors 101 may be a CdS detector, a CdSe detector, or a CdTe detector, each type of which has a corresponding band thereof falling within both visible region and infrared region, and the field of display technology also typically utilizes visible light, i.e., above photoelectrical detectors all meet requirements in detection.

And a working principle of a thermal detector lies in that, once a semi-conductor material absorbs energy from optical radiation, its temperatures rises accordingly so as to change its electrical properties; and a most essential feature thereof differing from aforementioned photoelectrical detector lies in that it has no selectivity on light at different wavelengths.

Furthermore, as illustrated in FIGS. 1, 2, and 3, by way of example, the touch display panel 100 further includes: a black matrix 501 which is for example arranged to be located at a side of the detection layer 10 for light-intensity facing away from both the first base substrate 70 and the liquid crystal layer 20 and to abut against a second base substrate 60 which is opposite to the first base substrate 70, and a signal wiring 102 which is arranged to be connected with the plurality of detectors 101, orthographic projections of the plurality of detectors 101 and the signal wiring 102 on the liquid crystal layer 20 being located within a orthographic projection of the black matrix 501 on the liquid crystal layer 20. Therefore, any loss in aperture ratio may be avoided so as to ensure a superior display effect of the touch display panel 100.

Furthermore, as illustrated in FIGS. 1, 2, and 3, by way of example, the touch display panel 100 further includes a color filter layer or color film layer 50 which is located at a side of the detection layer 10 for light-intensity facing away from the liquid crystal layer 20. And between the color filter layer 50 and the detection layer 10 for light-intensity there may for example provide additionally a first alignment layer, which is for example manufactured by PI (polyimide) material, for adjustment in orientations of liquid crystal molecules of the liquid crystal layer 20. By provision of the color filter layer 50, light passing therethrough may show different colors so as to form colored images.

Furthermore, as illustrated in FIGS. 1 and 2, by way of example, the touch display panel 100 further includes an array substrate which is provided at a side of the liquid crystal layer facing away from the detection layer 10 for light-intensity and includes: the first base substrate 70; an array layer 90 which is provided at a side of the liquid crystal layer 20 facing away from the detection layer 10 for light-intensity and may further be provided with thin-film transistors; and a touch-sensing signal transmission layer 80 provided between the liquid crystal layer 20 and the array layer 90 for transferring a touch signal. Between the touch-sensing signal transmission layer 80 and the liquid crystal layer 20 there may for example be provided additionally a second alignment layer, which is for example manufactured by PI (polyimide) material, for adjustment in orientations of liquid crystal molecules of the liquid crystal layer 20 by itself, or by cooperation with the first alignment layer.

Correspondingly, there is provided a display device in embodiments of the disclosure, including a housing, the touch display panel 100, and a drive circuit for the touch display panel. Therefore, the display device also has the advantages of the touch display panel 100, without being repeated herein once again. The display device may for example be electronic paper, smartphone, tablet computer, television set, display, laptop computer, digital photo frame, navigator or any product or component having display function.

Figure 5:
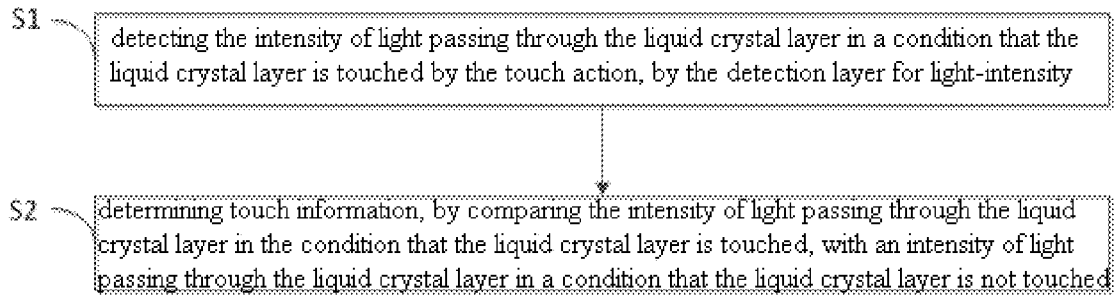
FIG. 5 illustrates a schematic flow chart of a method for driving the touch display panel according to embodiments of the disclosure.

Referring to FIG. 5, there is further provided a method for driving the touch display panel, which method is applicable to the touch display panel 100 as set forth in any one technical solution as above, and includes the following steps:

Step 1: detecting the intensity of light passing through the liquid crystal layer 20 in a condition that the touch position on the touch display panel is touched by the touch action, by the detection layer 10 for light-intensity.

Specifically, since when the touch display panel 100 is subject to the pressure applied by the touch action at the touch position thereof, a location on the liquid crystal layer 20 corresponding to the touch position may suffer from a slight deformation, resulting in a decreased amount of liquid crystal at the position, and in turn a decrease in the intensity of light passing therethrough.

Step 2: determining touch information, by comparing the intensity of light passing through the liquid crystal layer in the condition that the touch position on the touch display panel is touched, with an intensity of light passing through the liquid crystal layer in a condition that the touch position on the touch display panel is not touched.

Specifically, the touch information includes the touch position and the magnitude of the pressure applied by the touch action at the touch position, but not limited thereto.

Figure 6:
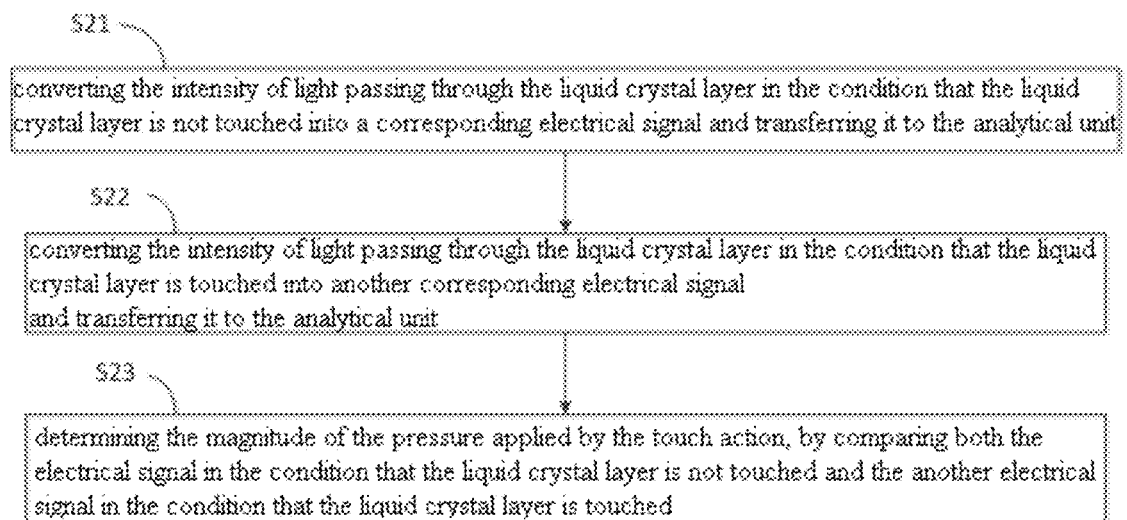
FIG. 6 illustrates a schematic flow chart of a method for determining a magnitude of the pressure applied by the touch action according to embodiments of the disclosure.

In a further embodiment of the disclosure, referring to FIG. 6, in a condition that there exists the analytical unit 30, the magnitude of the pressure applied by the touch action may be determined by following steps:

Step S21: converting the intensity of light passing through the liquid crystal layer in the condition that the touch position on the touch display panel is not touched into a corresponding electrical signal (which is abbreviated as "first electrical signal" hereinafter for brevity) and transferring it to the analytical unit 30;

Step S22: converting the intensity of light passing through the liquid crystal layer in the condition that the touch position on the touch display panel is touched into another corresponding electrical signal (which is abbreviated as "second electrical signal" hereinafter for brevity) and transferring it to the analytical unit 30; and Step S23: determining the magnitude of the pressure applied by the touch action, by comparing the first electrical signal in the condition that the touch position on the touch display panel is not touched and the second electrical signal in the condition that the touch position on the touch display panel is touched.

By way of example, the intensity of light passing through the liquid crystal layer in the condition that the touch position on the touch display panel is not touched is determined, e.g., by detection implemented by the detection layer 10 for light-intensity; in other words, in the condition that the touch display panel 100 is not touched, the detection layer 10 for light-intensity detects in advance the intensity of light passing through the liquid crystal layer 20 at a region thereof corresponding to a location on the touch display panel corresponding to a preset touch position. Or alternatively, the intensity of light passing through the liquid crystal layer in the condition that the touch position on the touch display panel is not touched is determined, e.g., by detecting brightness of the touch display panel 100 in the condition that the touch position on the touch display panel is not touched; and typically, the brightness is positively correlated to the intensity of light passing therethrough.

Once the analytical unit 30 receives both electrical signals in both conditions that the touch position on the touch display panel is touched and not touched by the touch action, it implements a comparison therebetween and a corresponding data processing, e.g., calculation of a difference therebetween, so as to determine the magnitude of the pressure applied by the touch action, and in turn rates the pressure.

For example, in order to further simplify steps of rating the pressure applied by the touch action, typically it is required that the analytical unit 30 stores therein a corresponding preset data table, in which different magnitudes of pressures applied by touch correspond to different ratings thereof, respectively; or pressures applied by touch falling in different ranges correspond to different ratings thereof, respectively. As such, if only the magnitude of the pressure applied by the touch action is determined, the rating of the pressure is also determined. Alternatively, the analytical unit 30 is associated with the preset data table which is stored in a storage device located outside the analytical unit, and the analytical unit 30 for example invokes/calls the data table from the storage device so as to rate the level of the pressure depending on the magnitude thereof, as required.

As compared with the conventional 3D touch technology which typically contains only two modes of touch (i.e., "micro vibration" and "full-scale vibration" or "absolute vibration" as mentioned above) in the prior art, by a more delicate/sophisticated rating of the pressure applied by touch, the touch display panel 100 in the embodiments of the disclosure has more modes of touch, each of which is configured to correspond to different display contents and display effects, such that the touch display panel 100 may present corresponding display contents and display effects depending on specific mode of touch as determined, resulting in significantly enriched display functions of the touch display panel 100.

Similarly, in the condition that the detection layer 10 for light-intensity includes the plurality of detectors 101 which are arranged in an array, each of the plurality of detectors 101 is for example marked correspondingly with values of preset coordinates thereof, respectively, so as to facilitate determination of specific touch position based on the preset coordinates in a condition that variations of light intensity is detected by one or more of the plurality of detectors 101 marked with these of preset coordinates, and in turn to facilitate display of corresponding different display contents and different display effects on the touch display panel 100 depending on different touch position as determined.

Figure 7:
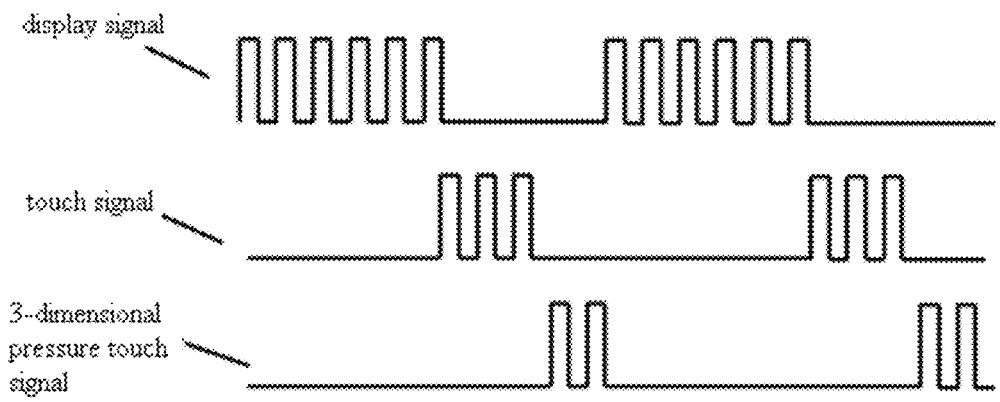
FIG. 7 illustrates a schematic view of a method for time-sharing driving of display signal, transferring signal (i.e., signal being delivered) and touch signal in a display control method according to an embodiment of the disclosure.

Referring now to FIG. 7, in order to avoid adverse effects on the plurality of detectors 101 caused by interference among signals and/or brightness variation (or referred to as "luminance fluctuation") due to switch among pictures, it is required to implement a time-sharing driving of display signal, touch signal, and 3-dimensional pressure touch signal; in other words, it is required to allocate a time period of one frame to the display to the display signal, the touch signal and the 3-dimensional pressure touch signal, proportionally (i.e., in a certain ratio thereamong), such that a description on (i.e., scanning of) the touch action may be implemented during a period in which the touch display panel does not display, and once the analytical unit 30 determines the pressure applied by the touch action, a signal may be output therefrom towards a display circuit for assisting in control of switching to next frame of pictures. Certainly, when the pressure applied by the touch action varies, for example, by adjustment on specific time periods allocated respectively to the display signal, the touch signal and the 3-dimensional pressure touch signal, a variable display effect may be presented.

As compared with the prior art, there are several advantageous technical effects brought about by the technical solutions as provided in embodiments of the disclosure, as below:

In the touch display panel according to embodiments of the disclosure, the detection layer for light-intensity is used to detect the intensity of light passing through the liquid crystal layer, and once the liquid crystal layer is subject to the pressure applied by the touch action at the touch position on the touch display panel, since the amount of liquid crystal molecules at a location corresponding to the touch position is thus decreased, then a decreased display brightness/luminance there may be incurred accordingly, resulting in a decrease in the intensity of light passing through the liquid crystal layer. The detection layer for light-intensity then determines the variation of the intensity of light passing through the liquid crystal layer at the region thereof corresponding to the touch position on the touch display panel, depending on the two intensity of light as detected in both conditions that the touch position on the touch display panel is touched and not touched by the touch action, facilitating determination of the magnitude of a pressure applied on the touch display panel by the touch action by the external detection device or the internal detection device provided within the touch display panel.

In the touch display panel according to embodiments of the disclosure, the detection layer for light-intensity converts the determined intensity of light into the electrical signal, and then transfers the electrical signal to the analytical unit via the electrical connector provided between the detection layer for light-intensity and the analytical unit. Since the intensity of light detected in the condition that the touch position on the touch display panel is not touched by the touch action differs from the intensity of light detected in the condition that the touch position on the touch display panel is touched by the touch action, then the electrical signal converted from the former also differs from that converted from the latter; and then analytical unit compares the two different electrical signals with each other so as to determine the magnitude of the pressure applied by the touch action there. Once the magnitude of the pressure applied by the touch action is determined, different pressures applied during touch with different magnitudes may be preset to correspond to different display contents and display effects, then, for example, corresponding display contents and display effects may be presented on the touch display panel, depending on specific magnitudes of the pressure applied by the touch action as determined above, such that display functions of the touch display panel may be enriched hereby.

In the touch display panel according to embodiments of the disclosure, the sealant is doped with metallic material, such that the sealant possesses relative superior electrical conductivity. The sealant functions as aforementioned electrical connector provided between the detection layer for light-intensity and the analytical unit, facilitating delivery/transferring of the electrical signal to the analytical unit via the sealant by the detection layer for light-intensity.

In the touch display panel according to embodiments of the disclosure, the detection layer for light-intensity is provided with a plurality of detectors arranged in an array. By such a design, on one hand, it is ensured that light intensities at various points on the display panel may be acquired so as to obtain an overall distribution of intensity of light across the whole display panel; on the other hand, it may facilitate a definite determination of the specific touch position, which is acted on by the pressure applied by the touch action, on the touch display panel.

In the touch display panel according to embodiments of the disclosure, the plurality of detectors and the signal wiring are arranged that orthographic projections of the plurality of detectors and the signal wiring on the liquid crystal layer are located within a orthographic projection of the black matrix on the liquid crystal layer. Therefore, any loss in aperture ratio may be avoided so as to ensure a relatively good display effect of the touch display panel.

In the touch display panel according to embodiments of the disclosure, each of the plurality of detectors may be a CdS detector, a CdSe detector, or a CdTe detector, each type of which has corresponding band thereof falling within visible region and infrared region, and the field of display technology also typically utilizes visible light, i.e., above photoelectrical detectors all meet requirements in detection.

The display device in embodiments of the disclosure utilizes the touch display panel, and thus possesses advantages of the touch display panel.

In embodiments of the disclosure, the method for driving the touch display panel includes followings steps: detecting the intensity of light passing through the liquid crystal layer in the condition that the touch position on the touch display panel is touched by the touch action, by the detection layer for light-intensity; and determining touch information, by comparing the intensity of light passing through the liquid crystal layer in the condition that the touch position on the touch display panel is touched, with an intensity of light passing through the liquid crystal layer in a condition that the touch position on the touch display panel is not touched. Specifically, the touch information includes the touch position and the magnitude of the pressure applied by the touch action at the touch position. Once the detection layer for light-intensity detects the intensity of light passing through the liquid crystal layer, it converts the optical signal into the electrical signal. Then, the magnitude of the pressure applied by the touch action may be determined, by comparing the electrical signal in the condition that the touch position on the touch display panel is not touched with the electrical signal in the condition that the touch position on the touch display panel is touched; and the touch position may also be determined, by acquiring a position of a detector which obtains the variation of the intensity of light by detection thereof.

In the method for driving the touch display panel according to the embodiments of the disclosure, by rating different magnitudes of pressures applied by touch, and setting pressures of different ratings to be corresponding to different display contents and display effects, corresponding display contents and display effects may be presented on the touch display panel, e.g., based on the specific pressure of a determined rating as applied by the touch action, thereby meeting requirements on diversity of display and resulting in enriched display functions.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "including" or "having" an element or a plurality of elements having a particular property may include additional such elements not having that property.

What is claimed is:

1. A touch display panel, comprising:
   a liquid crystal layer; and
   a detection layer for light-intensity, which is located at a light exiting side of the liquid crystal layer and is configured to detect an intensity of light passing through the liquid crystal layer at a region thereof corresponding to a touch position on the touch display panel, in both conditions that the touch position on the touch display panel is touched and not touched by a touch action,
   wherein the detection layer for light-intensity comprises a plurality of detectors which are arranged in an array; and
   wherein the touch display panel further comprises a black matrix and a signal wiring which is arranged to be connected with the plurality of detectors, wherein orthographic projections of the plurality of detectors and the signal wiring on the liquid crystal layer are located within a orthographic projection of the black matrix on the liquid crystal layer.

2. The touch display panel according to claim 1, further comprising an analytical unit which is arranged to be connected electrically with the detection layer for light-intensity through an electrical connector, and is configured to receive an electrical signal which is generated from the detection layer for light-intensity through the electrical connector so as to determine a magnitude of a pressure applied by the touch action and in turn to rate a level of the pressure depending on the magnitude thereof as determined.

3. The touch display panel according to claim 2, further comprising sealant which functions as the electrical connector and is doped with metallic material, the analytical unit being connected electrically with the detection layer for light-intensity via the metallic material inside the sealant.

4. The touch display panel according to claim 1, wherein each of the plurality of detectors is one of a photoelectric detector and a thermal detector.

5. The touch display panel according to claim 1, further comprising a color filter layer which is located at a side of the detection layer for light-intensity facing away from the liquid crystal layer.

6. The touch display panel according to claim 1, further comprising an array layer provided at a side of the liquid crystal layer facing away from the detection layer for light-intensity and a touch-sensing signal transmission layer provided between the liquid crystal layer and the array layer.

7. A display device, comprising:
   a housing;
   the touch display panel according to claim 1; and
   a drive circuit for the touch display panel.

8. A method for driving a touch display panel, the touch display panel comprising: a liquid crystal layer; and a detection layer for light-intensity, which is located at a light exiting side of the liquid crystal layer and is configured to detect an intensity of light passing through the liquid crystal layer at a region thereof corresponding to a touch position on the touch display panel, in both conditions that the touch position on the touch display panel is touched and not touched by a touch action, wherein the detection layer for light-intensity comprises a plurality of detectors which are arranged in an array, and the touch display panel further comprises a black matrix and a signal wiring which is arranged to be connected with the plurality of detectors, wherein orthographic projections of the plurality of detectors and the signal wiring on the liquid crystal layer are located within a orthographic projection of the black matrix on the liquid crystal layer, the method comprising:
   detecting the intensity of light passing through the liquid crystal layer at the region thereof corresponding to the touch position on the touch display panel in a condition that the touch position on the touch display panel is touched by the touch action, by the detection layer for light-intensity; and
   determining touch information by comparing the intensity of light passing through the liquid crystal layer in the condition that the touch position on the touch display panel is touched, with an intensity of light passing through the liquid crystal layer in a condition that the touch position on the touch display panel is not touched.

9. The method according to claim 8, wherein the touch information comprises a magnitude of a pressure applied by the touch action and the touch position, and
   wherein determining touch information comprising determining the magnitude of the pressure applied by the touch action at the touch position.

10. The method according to claim 9, wherein the touch display panel further comprises an analytical unit, which is arranged to be connected electrically with the detection layer for light-intensity through an electrical connector, and configured to receive an electrical signal which is generated from the detection layer for light-intensity through the electrical connector so as to determine the magnitude of the pressure applied by the touch action and in turn to rate a level of the pressure depending on the magnitude thereof as determined; and
   wherein determining the magnitude of the pressure applied by the touch action at the touch position comprises:
      converting the intensity of light passing through the liquid crystal layer in the condition that the touch position on the touch display panel is not touched into a corresponding first electrical signal and transferring the first electrical signal to the analytical unit;
      converting the intensity of light passing through the liquid crystal layer in the condition that the touch position on the touch display panel is touched into a corresponding second electrical signal and transferring the second electrical signal to the analytical unit; and determining the magnitude of the pressure applied by the touch action, by comparing the first electrical signal in the condition that the touch position on the touch display panel is not touched and the second electrical signal in the condition that the touch position on the touch display panel is touched.

11. The method according to claim 10, wherein the analytical unit stores therein a data table which contains ratings of the pressure applied by the touch action corresponding to different magnitudes of the pressure, and the analytical unit rates the level of the pressure depending on the magnitude thereof.

12. The method according to claim 10, wherein a storage device which is located outside the analytical unit stores therein a data table which contains ratings of the pressure applied by the touch action corresponding to different magnitudes of the pressure, and the analytical unit invokes the data table from the storage device and rates the level of the pressure depending on the magnitude thereof.

13. The method according to claim 9, wherein the detection layer for light-intensity comprises a plurality of detectors which are arranged in an array, and each of the plurality of detectors is marked with values of coordinates thereof, respectively.

14. The method according to claim 8, wherein the intensity of light passing through the liquid crystal layer in the condition that the touch position on the touch display panel is not touched is determined by one of:

detecting the intensity of light passing through the liquid crystal layer in the condition that the touch position on the touch display panel is not touched, by the detection layer for light-intensity; and detecting brightness of the touch display panel in the condition that the touch position on the touch display panel is not touched.

* * * * *